(12) United States Patent
Gentile et al.

(10) Patent No.: US 10,229,040 B2
(45) Date of Patent: Mar. 12, 2019

(54) OPTIMIZING EXECUTION ORDER OF SYSTEM INTERVAL DEPENDENT TEST CASES

(71) Applicant: International Business Machines Corporation, Armonk, NY (US)

(72) Inventors: Joseph W. Gentile, Hopewell Junction, NY (US); Brian D. Keuling, Poughkeepsie, NY (US); Anthony T. Sofia, New Paltz, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 211 days.

(21) Appl. No.: 15/189,348

(22) Filed: Jun. 22, 2016

(65) Prior Publication Data
US 2017/0371773 A1  Dec. 28, 2017

(51) Int. Cl.
*G06F 11/36* (2006.01)
(52) U.S. Cl.
CPC .................. *G06F 11/3688* (2013.01)
(58) Field of Classification Search
CPC ............. G06F 11/3684; G06F 11/3688; G06F 11/3692
See application file for complete search history.

(56) References Cited

U.S. PATENT DOCUMENTS

| | | | |
|---|---|---|---|
| 6,233,701 B1 | 5/2001 | Onoue | |
| 7,007,207 B2 | 2/2006 | Emek et al. | |
| 7,178,063 B1 | 2/2007 | Smith | |
| 7,316,004 B2 | 1/2008 | Sluiman et al. | |
| 7,581,138 B2 | 8/2009 | Bartucca et al. | |
| 9,424,171 B1* | 8/2016 | Chirgwin | G06F 11/3672 |
| 2007/0294579 A1* | 12/2007 | Fay | G06F 11/26 714/30 |
| 2009/0265681 A1* | 10/2009 | Beto | G06F 11/3672 717/100 |
| 2009/0265693 A1* | 10/2009 | Bakowski | G06F 11/3688 717/131 |
| 2013/0117611 A1* | 5/2013 | Chakraborty | G06F 11/3672 714/33 |

* cited by examiner

*Primary Examiner* — Jason B Bryan
(74) *Attorney, Agent, or Firm* — Cantor Colburn LLP; William Kinnaman (57) ABSTRACT

Systems, methods, and computer-readable media for optimizing the execution order of a set of test programs that includes at least one system interval dependent test program are disclosed. The optimized execution order may be determined by identifying each non-system interval dependent test program that can be executed during each instance of a system interval without impacting execution of system interval dependent test programs. The optimized execution order minimizes a total execution time of the set of test programs.

14 Claims, 4 Drawing Sheets

OPTIMIZING EXECUTION ORDER OF SYSTEM INTERVAL DEPENDENT TEST CASES

BACKGROUND

Test programs are computer-executable programs that may be executed to evaluate one or more properties of interest in connection with the operation of a software or hardware component. Test programs may be executed with respect to a component or system being tested in order to validate data inputs or outputs, to ensure that operations of the component or system are performed within acceptable time limits, to ensure that the component or system can be successfully installed and run in an intended environment, and so forth.

Certain test programs may require a system interval to expire prior to completing execution. Such test programs may be referred to as system interval dependent test programs. A system interval may be certain duration of time (e.g., a minute, ten minutes, an hour, etc.), at the expiration of which an event may occur. A system interval dependent test program may require the event to occur prior to completing its execution. For example, a system interval may trigger the reporting of accounting data that a system interval dependent test program may validate.

Oftentimes, some portion of a system interval dependent test program is executed prior to expiration of a system interval, and upon expiration of the system interval, a remainder of the test program is executed to perform validation processing. In those cases in which a system interval dependent test program is only performing a small task prior to expiration of the interval, relatively simple test programs can result in significantly elongated execution times. The automation and inclusion of system interval dependent test programs into regression test suites may result in further dramatic increases in total execution time as the number of such test programs increases.

Discussed herein are technical solutions that optimize the execution order of system interval dependent test programs to address at least the above-mentioned drawback as well as other drawbacks.

SUMMARY

In one or more example embodiments of the disclosure, a method for optimizing execution of a set of test cases is disclosed. The method includes identifying the set of test cases, where the set of test cases includes at least one system interval dependent test case. The method further includes determining a duration of a system interval, and determining a respective execution time associated with each test case in the set of test cases. The method finally includes determining, based at least in part on the duration of the system interval and the respective execution time associated with each test case, an execution order for the set of test cases, where the execution order specifies an order in which the set of test cases are to be executed in order to minimize a total execution time for the set of test cases.

In one or more other example embodiments of the disclosure, a system for optimizing execution of a set of test cases is disclosed. The system includes at least one memory storing computer-executable instructions and at least one processor configured to access the at least one memory and execute the computer-executable instructions to perform a set of operations. The operations include identifying the set of test cases, where the set of test cases includes at least one system interval dependent test case. The operations further include determining a duration of a system interval, and determining a respective execution time associated with each test case in the set of test cases. The operations finally include determining, based at least in part on the duration of the system interval and the respective execution time associated with each test case, an execution order for the set of test cases, where the execution order specifies an order in which the set of test cases are to be executed in order to minimize a total execution time for the set of test cases.

In one or more other example embodiments of the disclosure, a computer program product for optimizing execution of a set of test cases is disclosed that includes a non-transitory storage medium readable by a processing circuit, the storage medium storing instructions executable by the processing circuit to cause a method to be performed. The method includes a method for optimizing execution of a set of test cases is disclosed. The method includes identifying the set of test cases, where the set of test cases includes at least one system interval dependent test case. The method further includes determining a duration of a system interval, and determining a respective execution time associated with each test case in the set of test cases. The method finally includes determining, based at least in part on the duration of the system interval and the respective execution time associated with each test case, an execution order for the set of test cases, where the execution order specifies an order in which the set of test cases are to be executed in order to minimize a total execution time for the set of test cases.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Example embodiments of the disclosure include, among other things, systems, methods, computer-readable media, techniques, and methodologies for optimizing the execution order of a set of test programs that includes at least one system interval dependent test program in order to minimize or reduce a total execution time of the set of test programs. A system interval dependent test program may be a test program that requires a system interval to expire and one or more events to occur after expiration of the system interval in order to complete its execution. An event that occurs after expiration of a system interval may be referred to herein as a system interval event. Further, the terms test program and test case may be used interchangeably herein.

According to example embodiments of the disclosure, a test case execution optimization system may be provided. The test case execution optimization system may receive test case metadata as input. The test case metadata may include an identification of a set of test cases including an identification of those test case(s) that are system interval dependent. The test case metadata may further specify a system interval time (e.g., 1 minute), a respective execution time for each test case, a respective indication as to whether each test case can run in parallel or must be executed serially, and so forth. The execution time specified for each system interval dependent test case may include both an execution time prior to expiration of the system interval as well as an execution time after expiration of the system interval.

The test case execution optimization system may then execute a sorting algorithm to generate a sorted output test case list indicative of an order in which the test cases are to be executed. The order specified by the sorted output test case list may represent an optimized execution order that minimizes the total execution time of the test cases while still ensuring that both system interval dependent test cases and non-system interval dependent cases are able to complete execution barring any unforeseen execution errors or changes in runtime.

The sorting algorithm may operate by determining which of those test cases that are not dependent on a system interval can be executed in between execution of each of the test cases that are dependent on the system interval. In particular, the sorting algorithm may determine an amount of time that is available between execution of system interval dependent test cases, while taking into account any time that a system interval dependent test case is required to execute prior to expiration of the system interval, and may further determine which non-system interval dependent test cases can be executed within the available time period based on their respective execution times.

The test case execution optimization system may then execute the test cases in the order specified by the sorted output test case list. Execution of the test cases may be monitored, and any test cases that fail to complete execution may be identified and re-sorted for execution along with new incoming test cases to be executed.

Figure 1:
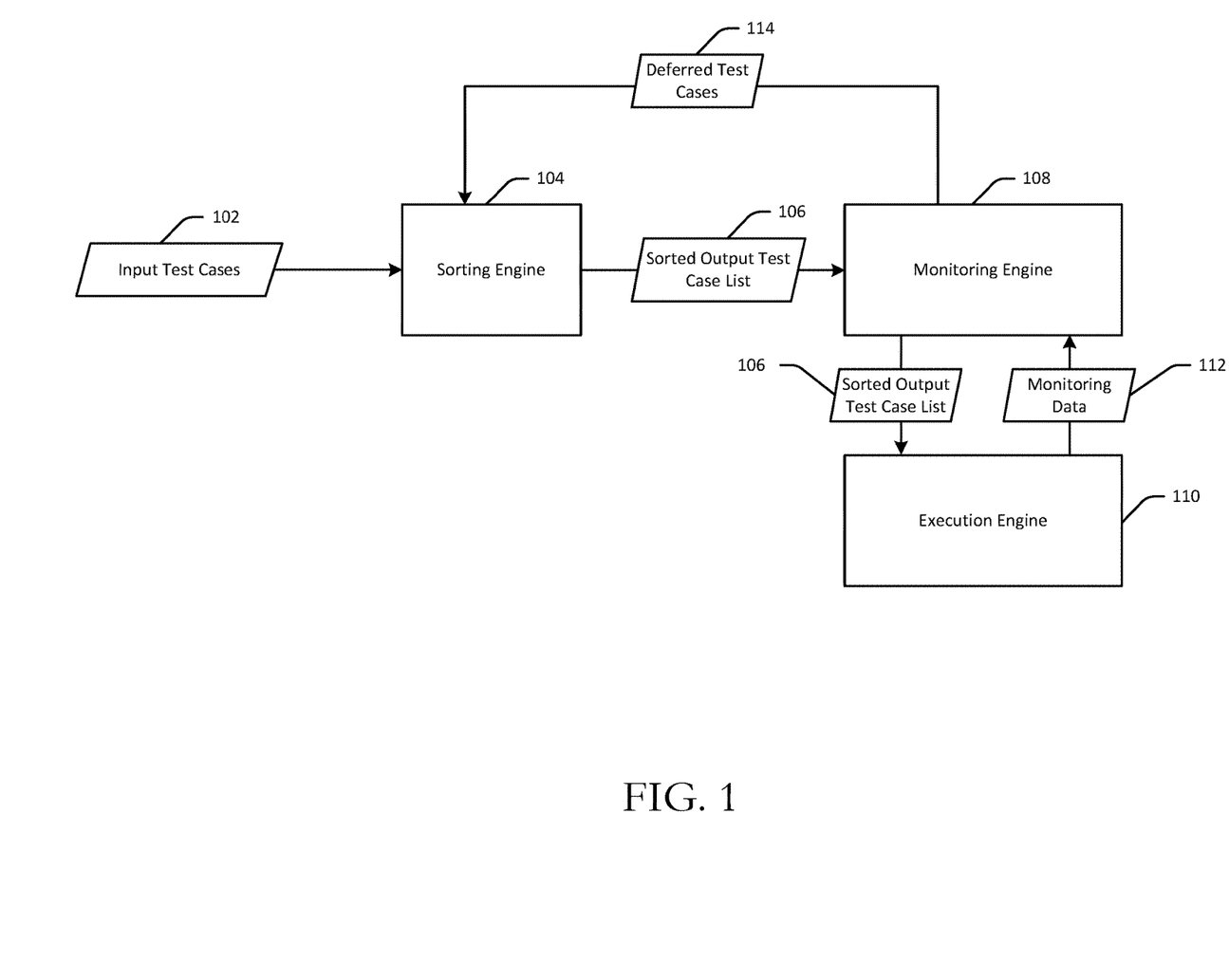
FIG. 1 is a hybrid system/process diagram depicting the sorting of input test cases that include one or more test cases that are dependent on a system interval event to generate a sorted output test case list indicative of an order of execution of the test cases in accordance with one or more example embodiments of the disclosure.
Figure 2:
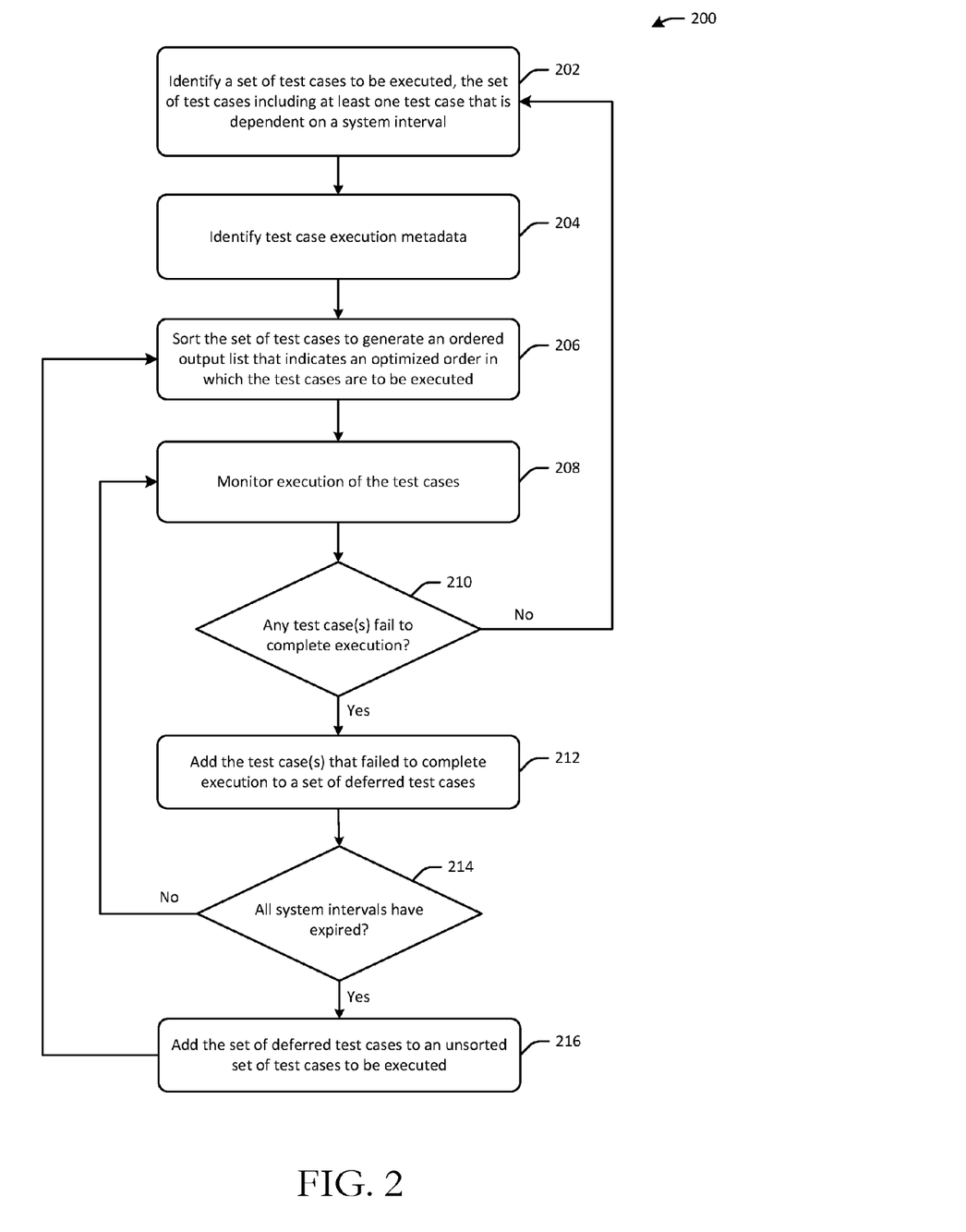
FIG. 2 is a process flow diagram of a method for sorting input test cases that include one or more test cases that are dependent on a system interval event to generate a sorted output test case list indicative of an order of execution of the test cases in accordance with one or more example embodiments of the disclosure.

FIG. 1 is a hybrid system/process diagram depicting the sorting of input test cases that include one or more test cases that are dependent on a system interval event to generate a sorted output test case list indicative of an order of execution of the test cases in accordance with one or more example embodiments of the disclosure. FIG. 2 is a process flow diagram of a method 200 for sorting input test cases that include one or more test cases that are dependent on a system interval event to generate a sorted output test case list indicative of an order of execution of the test cases in accordance with one or more example embodiments of the disclosure. FIGS. 1 and 2 will be described in conjunction with one another at times hereinafter.

One or more operations of the method 200 may be performed by one or more engines, or more specifically, by one or more program modules or sub-modules forming part of such engine(s). A module, which may contain or be a collection of one or more sub-modules, may include computer-executable instructions that when executed by a processing circuit may cause one or more operations to be performed. A processing circuit may include one or more processing units or nodes. Computer-executable instructions may include computer-executable program code that when executed by a processing unit may cause input data contained in or referenced by the computer-executable program code to be accessed and processed to yield output data. Any engine described herein may be implemented in any combination of software, hardware, and/or firmware.

Referring first to FIG. 1, illustrative components of a test case execution optimization system in accordance with example embodiments of the disclosure are depicted. In particular, a test case execution optimization system according to example embodiments of the disclosure may include a sorting engine 104, a monitoring engine 108, and an execution engine 110. Each of the sorting engine 104, the monitoring engine 108, and the execution engine 110 may include computer-executable instructions that cause corresponding operations to be performed responsive to execution by a processing circuit. The computer-executable instructions of an engine may be logically organized into one or more modules, each of which may contain one or more sub-modules.

Referring now to FIGS. 1 and 2 in conjunction with one another, at block 202, computer-executable instructions of the sorting engine 104 may be executed to identify a set of test cases that includes at least one test case that is dependent on a system interval. As previously noted, a test case that is dependent on a system interval (also referred to herein as a system interval dependent test case) may be a test case that waits on the occurrence of an event after the expiration of the system interval in order to complete its execution.

More specifically, the sorting engine 104 may be invoked by a calling application, whereby the sorting engine 104 may receive test case metadata 102 as input. In certain example embodiments, the calling application may be the monitoring engine 108, while in other example embodiments the calling application may be another engine or application. At block 202, computer-executable instructions of the sorting engine 104 may be executed to identify, from the test case metadata 102, a set of test cases to be executed. In particular, the test case metadata 102 may include an identification of the set of test cases to be executed. The test case metadata 102 may further include an identification of those test case(s) that are system interval dependent.

At block 204, computer-executable instructions of the sorting engine 104 may be executed to identify test case execution metadata contained in the test case metadata 102. The case execution metadata may specify a system interval time, for example. The system interval time may be specified as a particular duration of time (e.g., 2 minutes) or may be specified with respect to a periodicity of expiration of the system interval (e.g., at the top of each hour). The system interval may be determined by installation specific parameters. In certain example embodiments, different subsets of test cases may be associated with different system interval times. For example, a first system interval dependent test case may be associated with a system interval of 5 minutes, while a second system interval dependent test case may be associated with a system interval of 10 minutes.

The test case execution metadata may additionally specify a respective execution time for each test case, a respective indication as to whether each test case can run in parallel or must be executed serially, and so forth. The execution time specified for each system interval dependent test case may include both an execution time prior to expiration of the system interval as well as an execution time after expiration of the system interval.

At block 206, the sorting engine 104 may execute a sorting algorithm to generate a sorted output test case list 106 indicative of an order in which the test cases are to be executed. The order specified by the sorted output test case list 106 may represent an optimized execution order that minimizes the total execution time of the test cases while still ensuring that both system interval dependent test cases and non-system interval dependent cases are able to complete execution barring any unforeseen execution errors or changes in runtime. Stated another way, the optimized execution order may be an order of execution of the set of test cases that results in a most efficient cumulative runtime for the set of test cases.

More specifically, the sorting engine 104 may execute the sorting algorithm to determine which of those test cases that are not dependent on a system interval can be executed in between execution of each of the test cases that are dependent on the system interval. In particular, the sorting engine 104 may execute the sorting algorithm to determine an amount of time that is available between execution of system interval dependent test cases, while taking into account any time that a system interval dependent test case is required to execute prior to expiration of the system interval, and may further determine which non-system interval dependent test cases can be executed within the available time period based on their respective execution times. Stated another way, non-system interval dependent cases selected for execution in the time period between completion of execution of a system interval dependent test case and initiation of execution of a next system interval dependent test case may be associated with a cumulative execution time that is less than or equal to the duration of the system interval subtracted by any execution time that the next system interval dependent test case may require prior to expiration of the system interval.

Any gaps in time that may remain after allocating non-system interval dependent test cases for execution between system interval dependent test cases can be handled without execution error since system interval dependent test cases are designed to wait for an interval switch prior to completing execution. More specifically, execution error will not result even if there is time remaining between execution of a last non-system interval dependent test case that fits within a given system interval and initiation of execution of a next system interval dependent test case.

After all of the non-system interval dependent test cases have been sorted and allocated for execution during system intervals (e.g., between execution of system interval dependent test cases), any system interval dependent test case(s) that remain to be sorted may be placed at the end of the sorted output test case list 106. Further, any test case that can be executed in parallel with another test case, and that can complete execution within an available time slot between execution of system interval dependent test cases may be added to the sorted output test case list 106 sequentially for execution.

The sorting engine 104 may then pass the sorted output test case list to the monitoring engine 108. The monitoring engine 108 may communicate the sorted output test case list 106 to the execution engine 110. At block 208, computer-executable instructions of the execution engine 110 may be executed to cause the test cases to be executed in accordance with the order specified in the sorted output test case list 106. Further, at block 208, the monitoring engine 108 may monitor execution of the test cases. In certain example embodiments, one or more test cases may not complete execution due to, for example, an execution error, a runtime change that causes execution delay, or the like. Further, a test case (e.g., a non-system interval dependent test case or a system interval dependent test case) may not be able to begin execution at its allocated time due to an unexpected increase in execution time of a prior scheduled test case at runtime.

At block 210, computer-executable instructions of the monitoring engine 108 may be executed to determine whether any such test case(s) that failed to complete execution exist. In response to a negative determination at block 210, the method 200 may proceed iteratively from block 202 and any new input test cases received may be identified and sorted in accordance with corresponding test case execution metadata. On the other hand, in response to a positive determination at block 210, each such test case that failed to complete execution may be added to a set of deferred test cases at block 212.

At block 214, computer-executable instructions of the monitoring engine 108 may be executed to determine whether all system intervals have expired. That is, at block 214, the monitoring engine may determine whether all system interval buckets have completed. In response to a negative determination at block 214, the method 200 may proceed to block 208 where the monitoring engine 108 may continue to iteratively monitor test case execution. In response to a positive determination at block 214, the method 200 may proceed to block 216 where the set of deferred test cases may be added to a new unsorted set of test cases to be executed. The method 200 may then iteratively proceed from block 206 where the unsorted set of test cases (including the set of deferred test cases that failed to execute completely during prior system intervals) may be sorted. In this manner, an optimized order of execution may again be determined for each deferred test case. As previously noted, it should be appreciated that all system interval buckets may be completed (e.g., a positive determination at block 214), but one or more test cases may nonetheless fail to execute completely.

Figure 3:
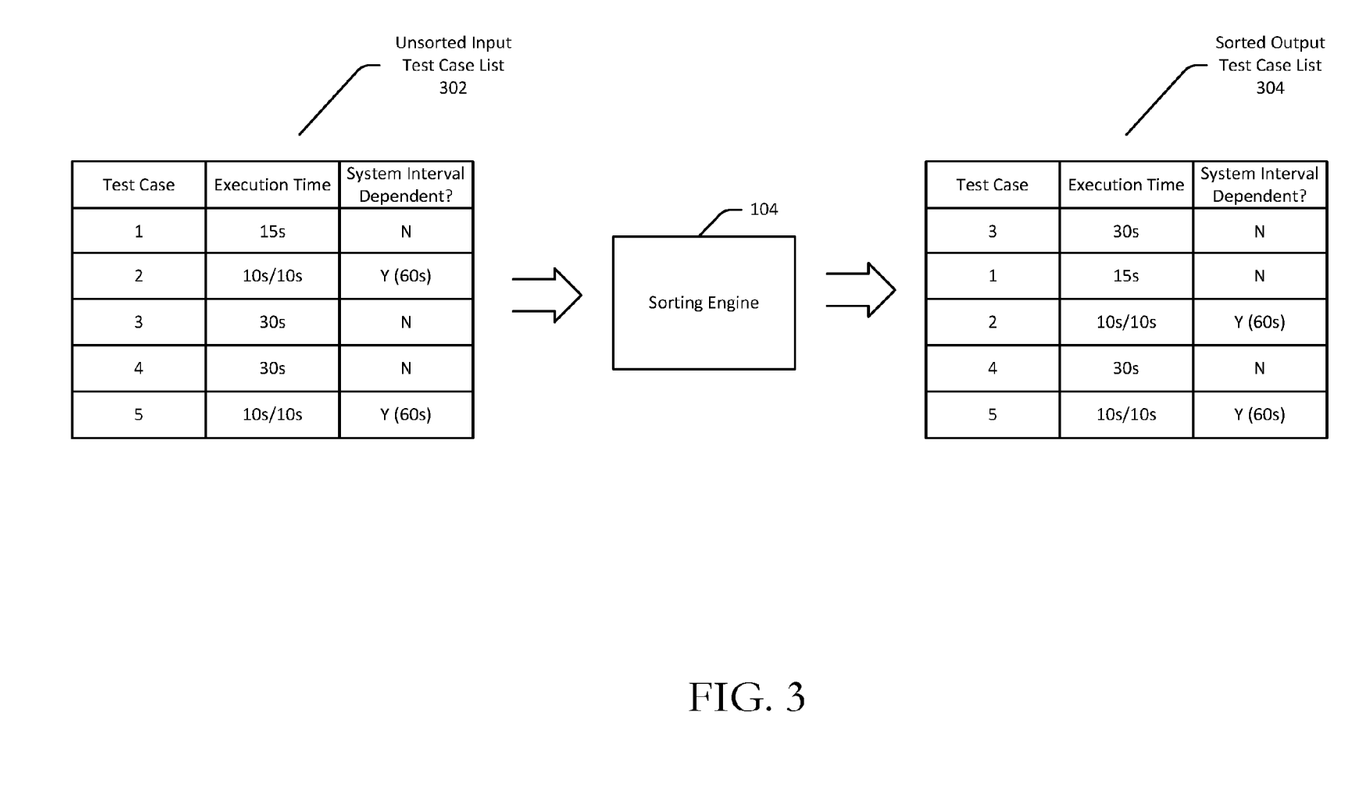
FIG. 3 is a schematic diagram illustrating the sorting of example input test cases that include both test cases that are dependent on a system interval event and test cases that are not dependent on a system interval event to generate a sorted output test case list indicative of an order of execution of the test cases in accordance with one or more example embodiments of the disclosure.

FIG. 3 is a schematic diagram illustrating the sorting of example input test cases that include both test cases that are dependent on a system interval event and test cases that are not dependent on a system interval event to generate a sorted output test case list indicative of an order of execution of the test cases in accordance with one or more example embodiments of the disclosure.

As shown in FIG. 3, an initial unsorted input test case list 302 may include test cases labeled 1 through 5. Test cases 1, 3, and 4 may be non-system interval dependent test cases, whereas test cases 2 and 5 may be system interval dependent test cases. Test cases 1, 3, and 4 may have corresponding execution times of 15 s, 30 s, and 30 s, respectively. Test cases 2 and 5 may each be dependent on a system interval of 60 s and may each have a partial execution of 10 s prior to expiration of the system interval and a partial execution time of 10 s after expiration of the system interval. While each of test cases 2 and 5 are dependent on a system interval of the same duration in the example of FIG. 3, it should be appreciated that the sorted input test case list 302 may include system interval dependent test cases that are dependent on system intervals of different durations.

The sorting engine 104 may receive the unsorted input test case list 302 and may proceed to execute a sorting algorithm to generate a sorted output test case list 304 in accordance with the methodology previously described. The sorted output test case list 304 may indicate an optimized execution order for the set of test cases. As shown in FIG. 3, the optimized execution order may indicate that test case 3 should be executed during a first system interval following by execution of test case 1. A cumulative execution time of test case 1 and test case 3 (assuming no execution errors or execution delay) is 40 s. The remaining 20 s prior to expiration of the system interval leaves enough time for system interval dependent test case 2 to partially execute for the required 10 s prior to expiration of the system interval. While 5 s still remains in the system interval during which no test case is being executed, this remaining time is insufficient to complete execution of another test case in this example. If, however, a test case existed that required only 5 s or less to execute, that test case should be inserted in the execution order for execution during this system interval.

At the expiration of the first system interval, test case 2 executes for 10 s during the next system interval. In particular, test case 2 may be dependent on the occurrence of an event that is scheduled to occur upon or after expiration of the first system interval, and may execute for the expected period of 10 s after expiration of the first system interval. For example, test case 2 may need to execute after expiration of the first system interval in order to perform validation processing with respect to one or more events that occur upon or after expiration of the first system interval. Test case 4 may then execute after test case 2 for a period of 30 s. A period of 20 s now remains in the current system interval, thus leaving enough time for test case 5 to partially execute for 10 s prior to expiration of the current system interval.

The optimized execution order represented by the sorted output test case list 304 may minimize the cumulative amount of time required for all test cases 1-5 to complete execution. In particular, if the test cases 1-5 were to be executed in the order specified in the unsorted input test case list 302, the total time required to complete execution of all test cases would be 190 s since each of test cases 2 and 5 are required to wait for the expiration of a system interval in order to complete execution and since there is not enough time in the second system interval for both test cases 3 and 4 to complete execution, and thus, test case 4 must wait for the second system interval to expire and the third system interval to begin prior to initiating execution. In contrast, the total time required for all test cases to complete execution in according with the optimized execution order of the sorted output test case list 304 is 130 s.

Example embodiments of the disclosure include or yield various technical features, technical effects, and/or improvements to technology. For instance, example embodiments of the disclosure provide the technical effect of reducing the total time required to complete execution of a set of test cases that includes at least one system interval dependent test case. This technical effect is achieved as a result of the technical features of optimizing the execution order of the set of test cases such that as many non-system interval dependent test cases as possible are designated for execution between system interval dependent test cases based on the respective execution times of the non-system interval dependent test cases and the respective partial execution times of the system interval dependent test cases prior to and subsequent to expiration of a system interval. By virtue of the technical effect of reducing the total time required to complete execution of a set of test cases that includes at least one system interval dependent test case, less computational resources (e.g., less memory usage and less processing capacity) are required to complete execution of set of test cases. Thus, example embodiments of the disclosure improve the functioning of a computer with respect to execution of a set of test cases that includes at least one system interval dependent test case. It should be appreciated that the above examples of technical features, technical effects, and improvements to the functioning of a computer and computer technology provided by example embodiments of the disclosure are merely illustrative and not exhaustive.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 4:
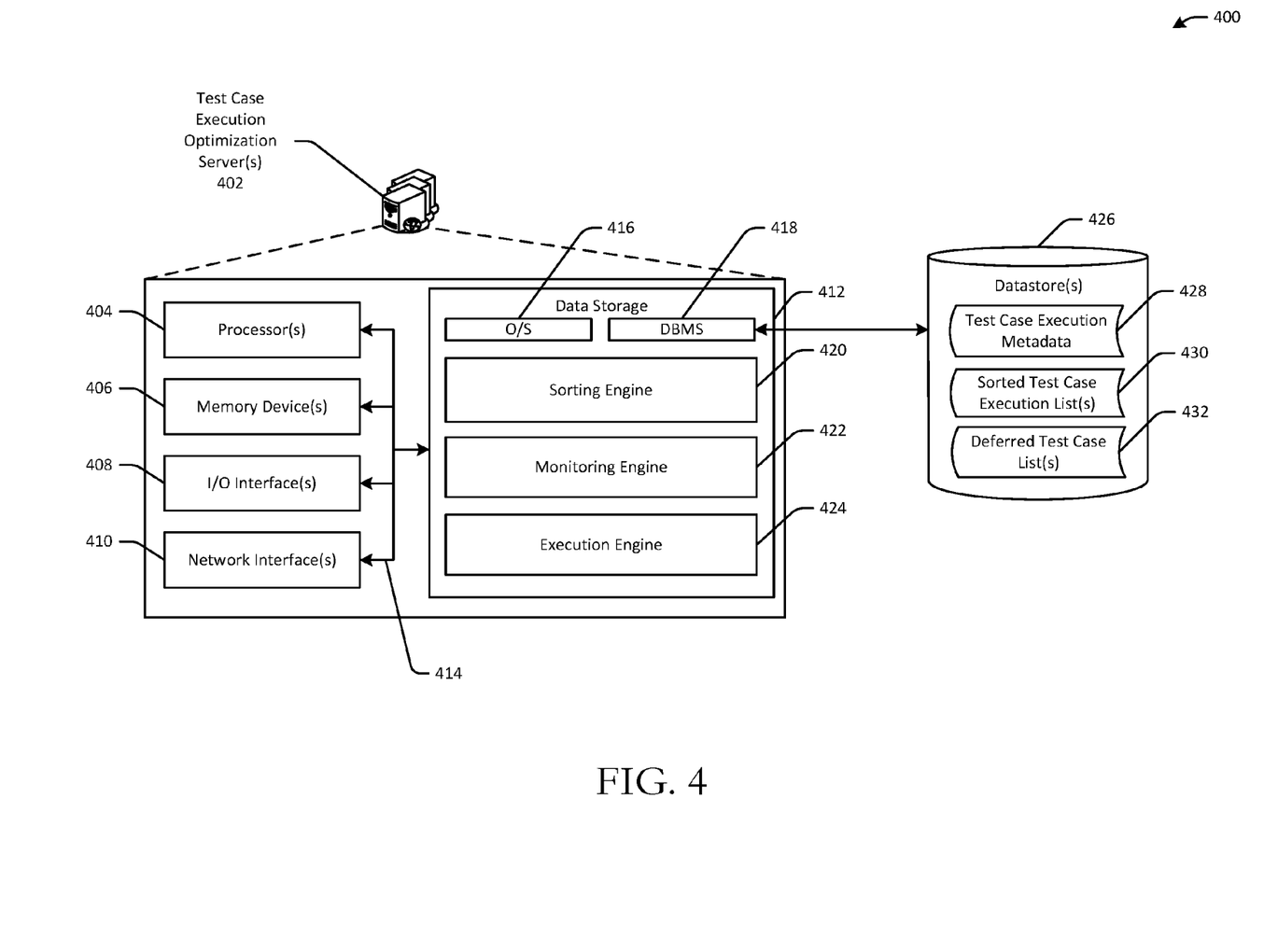
FIG. 4 is a schematic diagram of an illustrative computing system configured to implement one or more example embodiments of the disclosure.

FIG. 4 is a schematic diagram of an illustrative computing system 400 configured to implement one or more example embodiments of the disclosure. The test case execution optimization computing system 400 may include one or more test case execution optimization servers 402 and one or more data stores 426. While the test case execution optimization server(s) 402 may be described herein in the singular, it should be appreciated that multiple instances of the server 402 may be provided, and functionality described in connection with the server 402 may be distributed across such multiple instances.

In an illustrative configuration, the test case execution optimization server 402 may include one or more processors (processor(s)) 404, one or more memory devices 406 (generically referred to herein as memory 406), one or more input/output ("I/O") interface(s) 408, one or more network interfaces 410, and data storage 412. The test case execution optimization server 402 may further include one or more buses 414 that functionally couple various components of the test case execution optimization server 402.

The bus(es) 414 may include at least one of a system bus, a memory bus, an address bus, or a message bus, and may permit exchange of information (e.g., data (including computer-executable code), signaling, etc.) between various components of the test case execution optimization server 402. The bus(es) 414 may include, without limitation, a memory bus or a memory controller, a peripheral bus, an accelerated graphics port, and so forth. The bus(es) 414 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 406 of the test case execution optimization server 402 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 406 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 406 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 412 may include removable storage and/or non-removable storage including, but not limited to, magnetic storage, optical disk storage, and/or tape storage. The data storage 412 may provide non-volatile storage of computer-executable instructions and other data. The memory 406 and the data storage 412, removable and/or non-removable, are examples of computer-readable storage media (CRSM) as that term is used herein.

The data storage 412 may store computer-executable code, instructions, or the like that may be loadable into the memory 406 and executable by the processor(s) 404 to cause the processor(s) 404 to perform or initiate various operations. The data storage 412 may additionally store data that may be copied to memory 406 for use by the processor(s) 404 during the execution of the computer-executable instructions. Moreover, output data generated as a result of execution of the computer-executable instructions by the processor(s) 404 may be stored initially in memory 406 and may ultimately be copied to data storage 412 for non-volatile storage.

More specifically, the data storage 412 may store one or more operating systems (O/S) 416; one or more database management systems (DBMS) 418 configured to access the memory 406 and/or the data store(s) 426; and one or more program modules, applications, engines, computer-executable code, scripts, or the like such as, for example, a sorting engine 420, a monitoring engine 422, and an execution engine 424. Any of the components depicted as being stored in data storage 412 may include any combination of software, firmware, and/or hardware. The software and/or firmware may include computer-executable instructions (e.g., computer-executable program code) that may be loaded into the memory 406 for execution by one or more of the processor(s) 404 to perform any of the operations described earlier in connection with correspondingly named engines.

Although not depicted in FIG. 4, the data storage 412 may further store various types of data utilized by components of the test case execution optimization server 402 (e.g., any of the example types of data depicted as being stored data store(s) 426). Any data stored in the data storage 412 may be loaded into the memory 406 for use by the processor(s) 404 in executing computer-executable instructions. In addition, any data stored in the data storage 412 may potentially be stored in the data store(s) 426 and may be accessed via the DBMS 418 and loaded in the memory 406 for use by the processor(s) 404 in executing computer-executable instructions.

The processor(s) 404 may be configured to access the memory 406 and execute computer-executable instructions loaded therein. For example, the processor(s) 404 may be configured to execute computer-executable instructions of the various program modules, applications, engines, or the like of the test case execution optimization server 402 to cause or facilitate various operations to be performed in accordance with one or more embodiments of the disclosure. The processor(s) 404 may include any suitable processing unit capable of accepting data as input, processing the input data in accordance with stored computer-executable instructions, and generating output data. The processor(s) 404 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 404 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 404 may be capable of supporting any of a variety of instruction sets.

Referring now to other illustrative components depicted as being stored in the data storage 412, the O/S 416 may be loaded from the data storage 412 into the memory 406 and may provide an interface between other application software executing on the test case execution optimization server 402 and hardware resources of the test case execution optimization server 402. More specifically, the O/S 416 may include a set of computer-executable instructions for managing hardware resources of the test case execution optimization server 402 and for providing common services to other application programs (e.g., managing memory allocation among various application programs). In certain example embodiments, the O/S 416 may control execution of one or more of the engines depicted as being stored in the data storage 412. The O/S 416 may include any operating system now known or which may be developed in the future including, but not limited to, any server operating system, any mainframe operating system, or any other proprietary or non-proprietary operating system.

The DBMS 418 may be loaded into the memory 406 and may support functionality for accessing, retrieving, storing, and/or manipulating data stored in the memory 406, data stored in the data storage 412, and/or data stored in the external data store(s) 426. The DBMS 418 may use any of a variety of database models (e.g., relational model, object model, etc.) and may support any of a variety of query languages. The DBMS 418 may access data represented in one or more data schemas and stored in any suitable data repository. The data store(s) 426 that may be accessible by the test case execution optimization server 402 via the DBMS 418 may include, but are not limited to, databases (e.g., relational, object-oriented, etc.), file systems, flat files, distributed datastores in which data is stored on more than one node of a computer network, peer-to-peer network datastores, or the like. The data store(s) 426 may store various types of data including, without limitation, test case metadata 428, sorted test case execution list(s) 430, and deferred test case list(s) 432. It should be appreciated that, in certain example embodiments, any data store 426 and/or any of the data residing thereon may additionally, or alternatively, be stored locally in the data storage 412.

Referring now to other illustrative components of the test case execution optimization server 402, the input/output (I/O) interface(s) 408 may facilitate the receipt of input information by the test case execution optimization server 402 from one or more I/O devices as well as the output of information from the test case execution optimization server 402 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the test case execution optimization server 402 or may be separate. The I/O devices may further include, for example, any number of peripheral devices such as data storage devices, printing devices, and so forth.

The I/O interface(s) 408 may also include an interface for an external peripheral device connection such as universal serial bus (USB), FireWire, Thunderbolt, Ethernet port or other connection protocol that may connect to one or more networks. The I/O interface(s) 408 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The test case execution optimization server 402 may further include one or more network interfaces 410 via which the test case execution optimization server 402 may communicate with any of a variety of other systems, platforms, networks, devices, and so forth. The network interface(s) 410 may enable communication, for example, with one or more other devices via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the engines depicted in FIG. 4 as being stored in the data storage 412 are merely illustrative and not exhaustive and that processing described as being supported by any particular engine may alternatively be distributed across multiple engines, modules, or the like, or performed by a different engine, module, or the like. In addition, various program module(s), script(s), plug-in(s), Application Programming Interface(s) (API(s)), or any other suitable computer-executable code hosted locally on the test case execution optimization server 402 and/or hosted on other computing device(s) accessible via one or more networks, may be provided to support functionality provided by the engines depicted in FIG. 4 and/or additional or alternate functionality. Further, functionality may be modularized in any suitable manner such that processing described as being performed by a particular engine may be performed by a collection of any number of program modules, or functionality described as being supported by any particular engine may be supported, at least in part, by another engine. In addition, engines or program modules that support the functionality described herein may form part of one or more applications executable across any number of test case execution optimization servers 402 in accordance with any suitable computing model such as, for example, a client-server model, a peer-to-peer model, and so forth. In addition, any of the functionality described as being supported by any of the engines depicted in FIG. 4 may be implemented, at least partially, in hardware and/or firmware across any number of devices.

It should further be appreciated that the test case execution optimization server 402 may include alternate and/or additional hardware, software, or firmware components beyond those described or depicted without departing from the scope of the disclosure. More particularly, it should be appreciated that software, firmware, or hardware components depicted as forming part of the test case execution optimization server 402 are merely illustrative and that some components may not be present or additional components may be provided in various embodiments. While various illustrative engines have been depicted and described as software modules stored in data storage 412, it should be appreciated that functionality described as being supported by the engines may be enabled by any combination of hardware, software, and/or firmware. It should further be appreciated that each of the above-mentioned engines may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular engine may, in various embodiments, be provided at least in part by one or more other engines. Further, one or more depicted engines may not be present in certain embodiments, while in other embodiments, additional engines and/or program modules not depicted may be present and may support at least a portion of the described functionality and/or additional functionality.

One or more operations of the method 200 may be performed by a test case execution optimization server 402 having the illustrative configuration depicted in FIG. 4, or more specifically, by one or more program modules, engines, applications, or the like executable on such a device. It should be appreciated, however, that such operations may be implemented in connection with numerous other device configurations.

The operations described and depicted in the illustrative method of FIG. 2 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 2 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for optimizing execution of a set of test cases, the method comprising:
    identifying the set of test cases, the set of test cases comprising a first system interval dependent test case and a subset of non-system interval dependent test case;
    determining a duration of a system interval;
    determining a respective execution time associated with each test case in the set of test cases, wherein the respective execution time associated with the first system interval dependent test case comprises a first partial execution time prior to expiration of a first instance of the system interval and a second partial execution time subsequent to expiration of the first instance of the system interval;
    determining, based at least in part on the duration of the system interval and the respective execution time associated with each test case, an execution order for the set of test cases, wherein the execution order specifies an order in which the set of test cases are to be executed in order to minimize a total execution time for the set of test cases, and wherein determining the execution order comprises allocating the subset of non-system interval dependent test cases for execution during the first instance of the system interval prior to initiation of execution of the first system interval dependent test case; and
    executing the set of test cases in accordance with the determined execution order.

2. The method of claim 1, wherein the set of test cases further comprises an additional non-system interval dependent test case, and wherein determining the execution order further comprises:
    determining that the additional non-system interval dependent test case cannot be executed in a time remaining during the first instance of the system interval after execution of a last non-system interval dependent test case in the subset of non-system interval dependent test cases and prior to initiation of execution of the first system interval dependent test case; and
    designating the additional non-system interval dependent test case for execution during a second instance of the system interval that begins after expiration of the first instance of the system interval.

3. The method of claim 1, further comprising receiving test case metadata that includes an identification of the set of test cases, a respective identification of the first system interval dependent test case, an indication of the duration of the system interval, and an indication of the respective execution time associated with each test case in the set of test cases.

4. The method of claim 1, wherein the set of test cases is a first set of test cases, the method further comprising:
    monitoring execution of the first set of cases in accordance with the execution order;
    determining that a particular test case in the first set of test cases failed to execute completely;
    adding the particular test case to a second set of test cases to be executed; and
    determining an execution order for the second set of test cases.

5. The method of claim 1, wherein the set of test cases further comprises a second system interval dependent test case, and wherein the system interval is a first system interval, the method further comprising:
    determining that the first system interval dependent test case is dependent on the first system interval; and
    determining that the second system interval dependent test case is dependent on a second system interval,
    wherein the duration of the first system interval is different from a duration of the second system interval.

6. A system for optimizing execution of a set of test cases, the system comprising:
    at least one memory storing computer-executable instructions; and
    at least one processor configured to access the at least one memory and execute the computer-executable instructions to:
        identify the set of test cases, the set of test cases comprising a first system interval dependent test case and a subset of non-system interval dependent test case;
        determine a duration of a system interval;
        determine a respective execution time associated with each test case in the set of test cases, wherein the respective execution time associated with the first system interval dependent test case comprises a first partial execution time prior to expiration of a first instance of the system interval and a second partial execution time subsequent to expiration of the first instance of the system interval;
        determine, based at least in part on the duration of the system interval and the respective execution time associated with each test case, an execution order for the set of test cases, wherein the execution order specifies an order in which the set of test cases are to be executed in order to minimize a total execution time for the set of test cases, and wherein determining the execution order comprises allocating the subset of non-system interval dependent test cases for execution during the first instance of the system interval prior to initiation of execution of the first system interval dependent test case; and
        execute the set of test cases in accordance with the determined execution order.

7. The system of claim 6, wherein the set of test cases further comprises an additional non-system interval dependent test case, and wherein the at least one processor is configured to determine the execution order by executing the computer-executable instructions to:
    determine that the additional non-system interval dependent test case cannot be executed in a time remaining during the first instance of the system interval after execution of a last non-system interval dependent test case in the subset of non-system interval dependent test cases and prior to initiation of execution of the first system interval dependent test case; and designate the additional non-system interval dependent test case for execution during a second instance of the system interval that begins after expiration of the first instance of the system interval.

8. The system of claim 6, wherein the at least one processor is further configured to execute the computer-executable instructions to receive test case metadata that includes an identification of the set of test cases, a respective identification of the first system interval dependent test case, an indication of the duration of the system interval, and an indication of the respective execution time associated with each test case in the set of test cases.

9. The system of claim 6, wherein the set of test cases further comprises a second system interval dependent test case, and wherein the system interval is a first system interval, and wherein the at least one processor is further configured to execute the computer-executable instructions to:

determine that the first system interval dependent test case is dependent on the first system interval; and determine that the second system interval dependent test case is dependent on a second system interval, wherein the duration of the first system interval is different from a duration of the second system interval.

10. The system of claim 6, wherein the set of test cases is a first set of test cases, and wherein the at least one processor is further configured to execute the computer-executable instructions to:

monitor execution of the first set of cases in accordance with the execution order;

determine that a particular test case in the first set of test cases failed to execute completely;

add the particular test case to a second set of test cases to be executed; and determine an execution order for the second set of test cases.

11. A computer program product for optimizing execution of a set of test cases, the computer program product comprising a non-transitory storage medium readable by a processing circuit, the storage medium storing instructions executable by the processing circuit to cause a method to be performed, the method comprising:

identifying the set of test cases, the set of test cases comprising a first system interval dependent test case and a subset of non-system interval dependent test case;

determining a duration of a system interval;

determining a respective execution time associated with each test case in the set of test cases, wherein the respective execution time associated with the first system interval dependent test case comprises a first partial execution time prior to expiration of a first instance of the system interval and a second partial execution time subsequent to expiration of the first instance of the system interval;

determining, based at least in part on the duration of the system interval and the respective execution time associated with each test case, an execution order for the set of test cases, wherein the execution order specifies an order in which the set of test cases are to be executed in order to minimize a total execution time for the set of test cases, and wherein determining the execution order comprises allocating the subset of non-system interval dependent test cases for execution during the first instance of the system interval prior to initiation of execution of the first system interval dependent test case; and executing the set of test cases in accordance with the determined execution order.

12. The computer program product of claim 11, wherein the set of test cases further comprises an additional non-system interval dependent test case, and wherein determining the execution order further comprises:

determining that the additional non-system interval dependent test case cannot be executed in a time remaining during the first instance of the system interval after execution of a last non-system interval dependent test case in the subset of non-system interval dependent test cases and prior to initiation of execution of the first system interval dependent test case; and designating the additional non-system interval dependent test case for execution during a second instance of the system interval that begins after expiration of the first instance of the system interval.

13. The computer program product of claim 11, further comprising receiving test case metadata that includes an identification of the set of test cases, a respective identification of each of the first system interval dependent test case, an indication of the duration of the system interval, and an indication of the respective execution time associated with each test case in the set of test cases.

14. The computer program product of claim 11, wherein the set of test cases is a first set of test cases, the method further comprising:

monitoring execution of the first set of cases in accordance with the execution order;

determining that a particular test case in the first set of test cases failed to execute completely, adding the particular test case to a second set of test cases to be executed; and determining an execution order for the second set of test cases.

* * * * *